United States Patent
Yamazaki et al.

(10) Patent No.: US 6,266,572 B1
(45) Date of Patent: Jul. 24, 2001

(54) APPARATUS FOR GENERATING A NUMERICAL CONTROL COMMAND ACCORDING TO CUT RESISTANCE VALUE AND CUT TORQUE VALUE OF MACHINING SIMULATION

(75) Inventors: Kazuo Yamazaki, 44204 Greenview Dr., El Macero, CA (US) 95618; Kyoichi Yamamoto, Niwa-gun (JP); Naoki Morita, Yamatokoriyama (JP); Sadayuki Matsumiya, Kawasaki (JP)

(73) Assignees: Okuma Corporation, Nagoya; Kabushiki Kaisha Mori Seiki Seisakusho, Yamatokoriyama; Mitutoyo Corporation, Kawasaki, all of (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/101,194

(22) PCT Filed: Nov. 7, 1996

(86) PCT No.: PCT/JP96/03266

§ 371 Date: Jul. 2, 1998

§ 102(e) Date: Jul. 2, 1998

(87) PCT Pub. No.: WO98/19822

PCT Pub. Date: May 14, 1998

(51) Int. Cl.[7] .................................................. G06F 19/00
(52) U.S. Cl. .............................. 700/96; 700/96; 700/159; 700/173
(58) Field of Search ................................ 700/96, 97, 159, 700/160, 174, 179, 173, 177, 182, 186, 187; 318/561

(56) References Cited

U.S. PATENT DOCUMENTS 4,791,342  12/1988  Okamoto .
4,833,617 * 5/1989  Wang .............................. 364/474.15
4,912,625 * 3/1990  Glatfelter ............................. 364/192
5,101,363 * 3/1992  Rutkowski ........................... 364/578
5,274,574 * 12/1993 Tsujido et al. ................... 364/551.02
5,291,393 * 3/1994  Matsumoto et al. ................. 364/191
5,321,346 * 6/1994  Matsumura et al. ................ 318/571
5,412,759 * 5/1995  Yano et al. ............................ 395/83
5,561,601 * 10/1996 Inoue et al. ..................... 364/474.24
5,691,909 * 11/1997 Frey et al. ....................... 364/474.01
5,827,020 * 10/1998 Fujita et al. ........................... 409/80

FOREIGN PATENT DOCUMENTS

| 59-232749 | 12/1984 | (JP) . | |
|---|---|---|---|
| 63-2642 | 1/1988 | (JP) . | |
| 63-32749 U | 3/1988 | (JP) . | |
| 3-3757 | 1/1991 | (JP) . | |
| 4-205210 | 7/1992 | (JP) . | |
| 5-31647 | 2/1993 | (JP) . | |
| 405303420A * | 11/1993 | (JP) | ........................... G05B/19/405 |
| 6-19527 | 1/1994 | (JP) . | |
| 6-155245 | 6/1994 | (JP) . | |
| 6-262484 | 9/1994 | (JP) . | |
| 63-114852 | 1/1995 | (JP) . | |
| 7-20916 | 1/1995 | (JP) . | |
| 7-314290 | 12/1995 | (JP) . | |
| 409026809A * | 1/1997 | (JP) | .......................... G05B/19/4068 |
| 410105220A * | 4/1998 | (JP) | .......................... G05B/19/4068 |

* cited by examiner

Primary Examiner—Thomas Lee
Assistant Examiner—Chun Cao
(74) Attorney, Agent, or Firm—Oliff & Berridge PLC

(57) ABSTRACT

A method of simulation of NC machining, wherein machining simulation is carried out according to blank shape data, tool shape data and an NC program to modify the NC program or interpolation data by feedforward control so that optimum cutting conditions can be obtained. The simulation result can be used for correcting the NC program and the interpolation data at the next stage. Further, a record of tools used can be generated on the basis of this simulation result.

23 Claims, 14 Drawing Sheets

RECOGNITION OF AREA TO
BE MACHINED BASED ON
A PRESENT POSITION
OF A TOOL

TOTAL STOCK REMOVAL

| | TOOL | BLADE EDGE | NO. OF COLLISION | CUT AMOUNT(mm³) | CUT LENGTH(mm) | ENGAGEMENT ANGLE (°) | CUT LENGTH(mm) |
|---|---|---|---|---|---|---|---|
| 1 | BALL END MILL | 1-2 | 5,540,431 | 8,304 | 642,016 | 40~ | 0 |
| | | 2-3 | 4,416,932 | 13,136 | 552,349 | 20~40 | 10,009 |
| | | 3-4 | 3,827,976 | 31,799 | 480,947 | -10~20 | 450,947 |
| | | 4-5 | 1,776,003 | 19,150 | 222,077 | -20~-10 | 143,079 |
| | | 5- | 1,067,588 | 11,150 | 132,087 | ~-20 | 22,019 |
| 2 | END MILL | 1-2 | 1,888,132 | 45,825 | 235,000 | 40~ | 0 |
| | | 2-3 | 1,888,132 | 45,825 | 235,000 | 20~40 | 0 |
| | | 3-4 | 1,088,132 | 26,325 | 135,000 | -10~20 | 235,000 |
| | | 4-5 | 0 | 0 | 0 | -20~-10 | 0 |
| | | 5- | 0 | 0 | 0 | ~-20 | 0 |

ENGAGEMENT ANGLE E

SINCE THE REVOLUTION CENTER IS OUT OF
THE MATERIAL BEING MACHINED, E<0

SINCE THE REVOLUTION CENTER IS WITHIN
THE MATERIAL BEING MACHINED, E>0 z (x) (y) = h1 → (h1-1)

p (x, y, h1) = 1 → 0

US 6,266,572 B1

APPARATUS FOR GENERATING A NUMERICAL CONTROL COMMAND ACCORDING TO CUT RESISTANCE VALUE AND CUT TORQUE VALUE OF MACHINING SIMULATION

FIELD OF THE INVENTION

The present invention relates to a machining simulation device and method used in NC machining. More specifically, the present invention relates to a device and method for generating a numerical control command and actual tool performance information, based on machining simulation using data specifying material shape, tool shape, and machining shape.

BACKGROUND OF THE INVENTION

Referring to a block diagram in FIG. 1, an adjustment control command generating system used in a conventional numerical control system will be briefly explained hereinafter.

In an NC program memory 11, an NC program which will be used for up-coming machining is stored.

An NC program interpreting unit 12 reads the NC program in the NC program memory 11 block by block, and interprets the blocks. The NC program interpreting unit 12 sends to an interpolation processing unit 13 an interpolation kind, a target position, and a feedrate specified in the current block or specified prior to the current block as modal commands.

The interpolation processing unit 13 sends to a servo control unit 14 movements per unit time (per interpolation period) $\Delta x$, $\Delta y$, and $\Delta z$ of each shaft, based on the interpolation kind, the target position, and the feedrate.

The servo control unit 14 controls revolution of each motor based on the movements per unit time $\Delta x$, $\Delta y$, and $\Delta z$ of each shaft provided by the interpolation processing unit 13, and carries out an operation for each shaft.

A cut monitoring unit 15 receives a spindle load and a feeding shaft load actually detected by the servo control unit 14, and supplies at least one of the loads to an adjustment control unit 16.

The adjustment control unit 16 compares the spindle load and the feeding shaft load provided by the cut monitoring unit 15 with predetermined load values. If the spindle load or the feeding shaft load exceeds a predetermined overload judgment value, the adjustment control unit 16 raises an alarm or the like, and sends a command to the interpolation processing unit 13 to stop each shaft. If the spindle load or the feeding shaft load does not fall within a speed control detection range, the adjustment control unit 16 sends a speed changing command to the interpolation processing unit 13 to increase or decrease a feedrate. If the spindle load or the feeding shaft load is less than a predetermined air-cut judgment value, the adjustment control unit 16 sends to the interpolation processing unit 13 a feedrate command appropriate for air-cut.

Based on these commands, the interpolation processing unit 13 recalculates the movements per unit time (per interpolation period) $\Delta x$, $\Delta y$, and $\Delta z$ of each shaft, and sends the movement values to the servo control unit 14.

The above processing will then be repeated until the machining is finished.

A conventional NC program generating system will be explained hereinafter referring to a block diagram in FIG. 2.

An operator inputs to a machining data input unit 21 information necessary for generation of an NC program such as a kind of tool, size of the tool, material composition, and a tool path. The input result is sent to an NC program generating unit 23.

Using the information such as the tool kind, tool size, and material composition, a cut condition data table 22 has a data table structure which enables determination of a feedrate and spindle speeds or the like appropriate for the information. The NC program generating unit 23 refers to the cut condition table.

The NC program generating unit 23 generates an NC program based on the machining data such as the tool kind, the tool size, the material composition, and the tool path provided by the machining data input unit 21, and the cut condition read from the cut condition data table 22 such as the feedrate and spindle speeds or the like which are based on the tool kind, the tool size, and the material composition.

A table data changing unit 24 instructs a change in a relation table between the tool kind, tool size, material composition or the like and the feedrate, spindle speeds or the like.

An NC program editing unit 25 is for the operator to directly edit the NC program.

In the NC program generating system having such a configuration, if the operator wants to change the feedrate or the like in the NC program, one of the following three methods is adopted.

That is, any one of directly commanding the feedrate by the machining data input unit 21, commanding the change in the relationship table between the tool kind, tool size, material composition or the like and the feedrate, the number of spindle revolution or the like in advance, using the table data changing unit 24, or changing an F command using the NC program editing unit 25 is adopted.

A conventional actual tool performance information generating system will be explained referring to a block diagram in FIG. 3.

An NC program which will be used for up-coming machining is stored in an NC program storing unit 31.

An NC program interpreting unit 32 reads the NC program in the NC program memory 31 block by block, and interprets the blocks. The NC program interpreting unit 32 sends to an interpolation processing unit 33 an interpolation kind, a target position, and a feedrate specified in the current block or specified prior to the current block as modal commands. At the same time, based on the NC program, the NC program interpreting unit 32 sends to an actual tool performance information generating unit 36 information for generating actual tool performance information (such as a T command, a G01/G02/G03 command and an F command accompanying it, an S command, and an M02 or M03 command or the like).

The interpolation processing unit 33 sends to a servo control unit 34 movements per unit time (per interpolation period) $\Delta x$, $\Delta y$, and $\Delta z$ of each shaft, based on the interpolation kind, the target position, and the feedrate.

The servo control unit 34 controls revolution of each motor based on the movements per unit time $\Delta x$, $\Delta y$, and $\Delta z$ of each shaft provided by the interpolation processing unit 33, and carries out an operation for each shaft.

A cut monitoring unit 35 receives a spindle load and a feeding shaft load actually detected by the servo control unit 34, and supplies at least one of the loads to an adjustment control unit 36.

The actual tool performance information generating unit 36 performs accumulation of actual tool performance information or the like, based on the information obtained from the NC program interpreting unit 32. More specifically, the actual tool performance information generating unit 36 confirms a tool number based on the T command, recognizes that machining is being carried out based on the G01/G02/G03 command, recognizes the number of workpieces to be machined, based on the M02 or M03 command, and calculates a feedrate or a cut speed upon the machining, based on the information such as a tool diameter or the like specified by the F command, the S command, and the T command. Furthermore, the actual tool performance information generating unit 36 judges whether or not the tool is in an air-cutting state, based on the spindle load or the feeding shaft load provided by the cut condition monitoring unit 35.

The obtained actual tool performance information is then stored in an actual tool performance information storing unit 37 in the form of, for example, an actual cutting time of each tool, duration of a power-ON state, an air-cutting time during tool feeding, and the number of workpieces to be machined by each tool.

Problems to be Solved by the Invention

In an adjustment control command generating system in a conventional numerical control system, no matter how fast machining state information such as a spindle load or a feeding shaft load is fed back to the system, a delay in adjustment can essentially not be prevented from occurring, and control of "the present" can only be performed by information concerning "the past".

As a result, when a machining process is moved from machining with a heavy machining load to machining with a light machining load, a feedrate is controlled to be slow regardless of the actually light machining load, which leads to deterioration in machining efficiency. On the contrary, when a machining process is moved from machining with a light machining load to machining with a heavy machining load, a feedrate is controlled to be fast regardless of the actually heavy machining load, which leads to an excess load on a tool or inappropriate surface roughness. This trend is especially conspicuous in a case of machining under a fast feedrate.

Furthermore, in a conventional NC program generating system, a cut condition such as a feedrate is instructed by an operator's judgment, or rigidly determined by a tool kind, tool size, material composition or the like. Therefore, the cut condition has nothing to do with an actual cut resistance value or a cut torque.

As a consequence, it has been extremely difficult to continue cutting with an optimal feedrate or a cutting speed, which leads to earlier abrasion of a tool and deterioration in machining accuracy and surface roughness. Moreover, when a tool hits a portion of a material to be machined with a rapidly increasing cut resistance value, damage easily occurs to the tool and to the material to be machined.

Furthermore, a conventional actual tool performance information generating system stores, as actual tool performance information, an actual cutting time of each tool, duration of a power-ON state, an air-cutting time during tool feeding, and the number of workpieces to be machined by each tool. Information which would affect a tool life and machining accuracy, for example how an engagement angle of the tool has changed or which portion of the tool has had the heaviest load on it, has not been sufficiently obtained.

Therefore, it has been difficult to improve tool management techniques, machining techniques, and tool development techniques based on analysis of an effect of an ever-changing machining environment on a tool.

An object of the present invention is to provide a machining simulation device and method used in NC machining which solves the problems described above, performs a machining simulation on graphic data prior to actual machining, reflects the simulation result on actual machining and on generation of a machining program with a condition appropriate for actual machining such as a feedrate and a torque feed forward amount, and provides actual tool performance information useful for tool management techniques, machining techniques, and tool development techniques.

DISCLOSURE OF THE INVENTION

The above object can be achieved by a device which performs machining simulation in NC machining based on machining information, comprising machining simulation means for simulating cutting of a material to be machined based on machining information, and numerical control command generating means for generating a numerical control command based on cut information obtained from the machining simulation means.

The above object can also be achieved by a device which performs machining simulation in NC machining based on machining information, comprising machining simulation means for simulating cutting of a material to be machined based on machining information, and actual tool performance information generating means for generating actual tool performance information based on cut information obtained from the machining simulation means.

Furthermore, the above object can be achieved by constituting the machining information of an NC program, material shape data, and tool shape data.

Moreover, the above object can be achieved by constituting the machining simulation means of material shape data generating means for converting the material shape data into machining simulation shape data divided by three dimensional grid points prior to the machining simulation, simulation data storing means for storing the machining simulation shape data, and cut amount calculating means for calculating a cut amount to be cut and removed by a tool during passage of the tool through a material area on the grid points based on the NC program and the tool shape data, and also for changing information regarding presence or absence of the material within the grid points where the tool passes in accordance with the cut being carried out.

The present invention can also be achieved by machining simulation means comprising material shape data generating means for dividing material base in the material shape data by the grid points prior to the simulation and also for converting a material height into simulation shape data wherein vertical height data are expressed by the grid points, simulation shape storing means for storing the machining simulation shape data, and cut amount calculating means for calculating a cut amount to be cut and removed by a tool during passage of the tool through a material area on the grid points based on the NC program and the tool shape data, and also for changing information regarding the vertical height within the grid points where the tool passes in accordance with the cut being carried out.

The above object can further be achieved by constituting the vertical height data of height data of the area wherein the material exists or a combination of height data regarding height of the area wherein the material exists and height of an area wherein no material exists.

The above object can moreover be achieved by the numerical control command generating means generating an NC program so that a cut amount or a cut resistance value, or a cut torque obtained as the cut information falls within a predetermined range, or generating NC program decoded data which are generated by decoding the NC program within a numerical control device, or generating interpolation data generated by the NC program decoded data.

The above object can be achieved by the numerical control command generating means determining a torque feed forward amount based on a change in the cut amount obtained as cut information so that a feedrate or a cutting speed falls within a predetermined range.

The above object can further be achieved by the numerical control command generating means replacing a feedrate used in an NC program or in NC program decoded data which are generated by decoding the NC program within a numerical control device by a machine's rapid traverse speed, if the cut resistance value obtained as cut information becomes 0.

The above object can moreover be achieved by the numerical control command generating means replacing a feedrate used in an NC program or in NC program decoded data which are generated by decoding the NC program within a numerical control device by a faster interpolation feedrate, if the cut resistance value obtained as cut information becomes 0.

The above object can be achieved by the numerical control command generating means comprising load detection means for actually detecting at least one of a spindle load or a feeding shaft load, and interpolation suspension means for suspending an interpolation processing when the load detected by the load detection means and the cut amount, or the cut resistance value, or the cut torque, obtained as cut information, exceeds a predetermined relationship.

The above object can be achieved by the actual tool performance information generating means having a function for accumulating at least an amount of cut or a length of cut by each tool to be used for machining.

The above object can be achieved by the actual tool performance information generating means having a function for accumulating at least an amount of cut or a length of cut by each blade edge point of a tool to be used for machining.

The above object can be achieved by the actual tool performance information generating means having a function for accumulating the number of collisions between each tool to be used for machining and a material to be cut.

The above object can be achieved by the actual tool performance information generating means having a function for storing at least one of an engagement angle, whether the machining was up-cut or down-cut, a cut width, and a cut depth by each tool to be used for the machining.

The above object can be achieved by the material shape data being shape data obtained by the machining simulation based on the material shape data input, or data which are a portion of shape data obtained by the machining simulation and corrected by shape data actually obtained by measuring the material having been cut.

The above object can be achieved by a method for carrying out a machining simulation in NC machining based on machining information, comprising the steps of machining simulation for simulating a stock removal from a material based on machining information, and numerical control command generation for generating a numerical control command based on the cut information obtained by the machining simulation step.

The above object can be achieved by a method for carrying out a machining simulation in NC machining based on machining information, comprising the steps of machining simulation for simulating a stock removal from a material based on machining information, and actual tool performance information generation for generating actual tool performance information based on the cut information obtained by the machining simulation step.

The above object can be achieved by generating, in the numerical control command generating step, an NC program, or NC program decoded data obtained by decoding an NC program by the numerical control device, or generating interpolation data using the already generated NC program decoded data, in such a way that a cut amount, or a cut resistance value, or a cut torque, all of which are obtained as cut information, fall within a predetermined range.

For achieving the object described above, the present invention includes a medium storing a program which causes a computer to perform a machining simulation procedure for simulating a stock removal from a material based on machining information, and a numerical control command generation procedure for generating a numerical control command based on cut information.

The program which causes a computer to perform the simulation procedures is characterized by the fact that an NC program, or NC program decoded data obtained by decoding an NC program by the numerical control device, or interpolation data generated by the NC program decoded data, are generated so that a cut amount, or a cut resistance value, or a cut torque, all of which are obtained as cut information, fall within a predetermined range.

For achieving the object described above, the present invention includes a medium storing a program which causes a computer to perform a machining simulation procedure for simulating a stock removal from a material based on machining information, and an actual tool performance information generation procedure for generating actual tool performance information based on cut information.

BEST MODE FOR CARRYING OUT THE PRESENT INVENTION

A first embodiment related to a machining simulation device and method of the present invention used in NC machining is a machining simulation device which performs a real time machining simulation based on shape data regarding a material and a tool, and performs in advance a numerical control command for controlling an interpolation speed or a motor torque value at an appropriate value based on a cut amount recognized through the simulation or a cut resistance value found by the cut amount.

Hereinafter, an embodiment example of feedrate control by the present machining simulation device used in NC machining after interpolation processing and an embodiment example wherein a motor torque correction by the present machining simulation device used in NC machining is incorporated by sending the correction to a current control unit used for servo control will be explained.

Hereinafter, explanation will be provided referring to a block diagram in FIG. 4.

Figure 1:
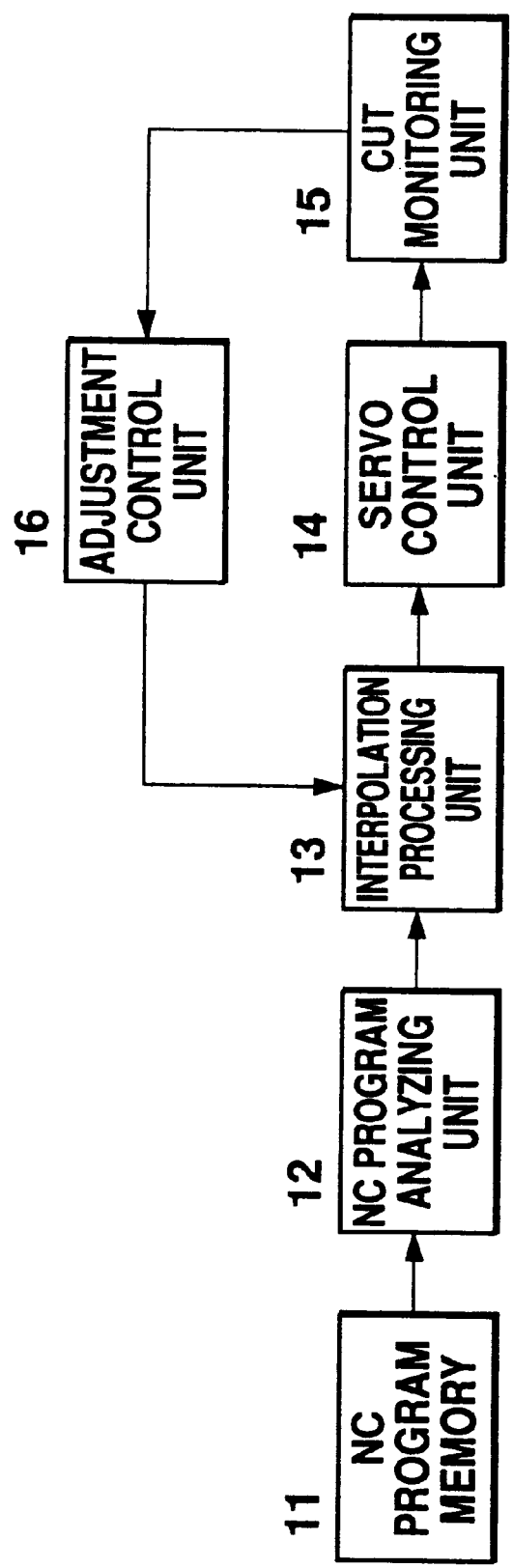
FIG. 1 is a block diagram showing an adjustment control command generating system in a conventional numerical control system.
Figure 4:
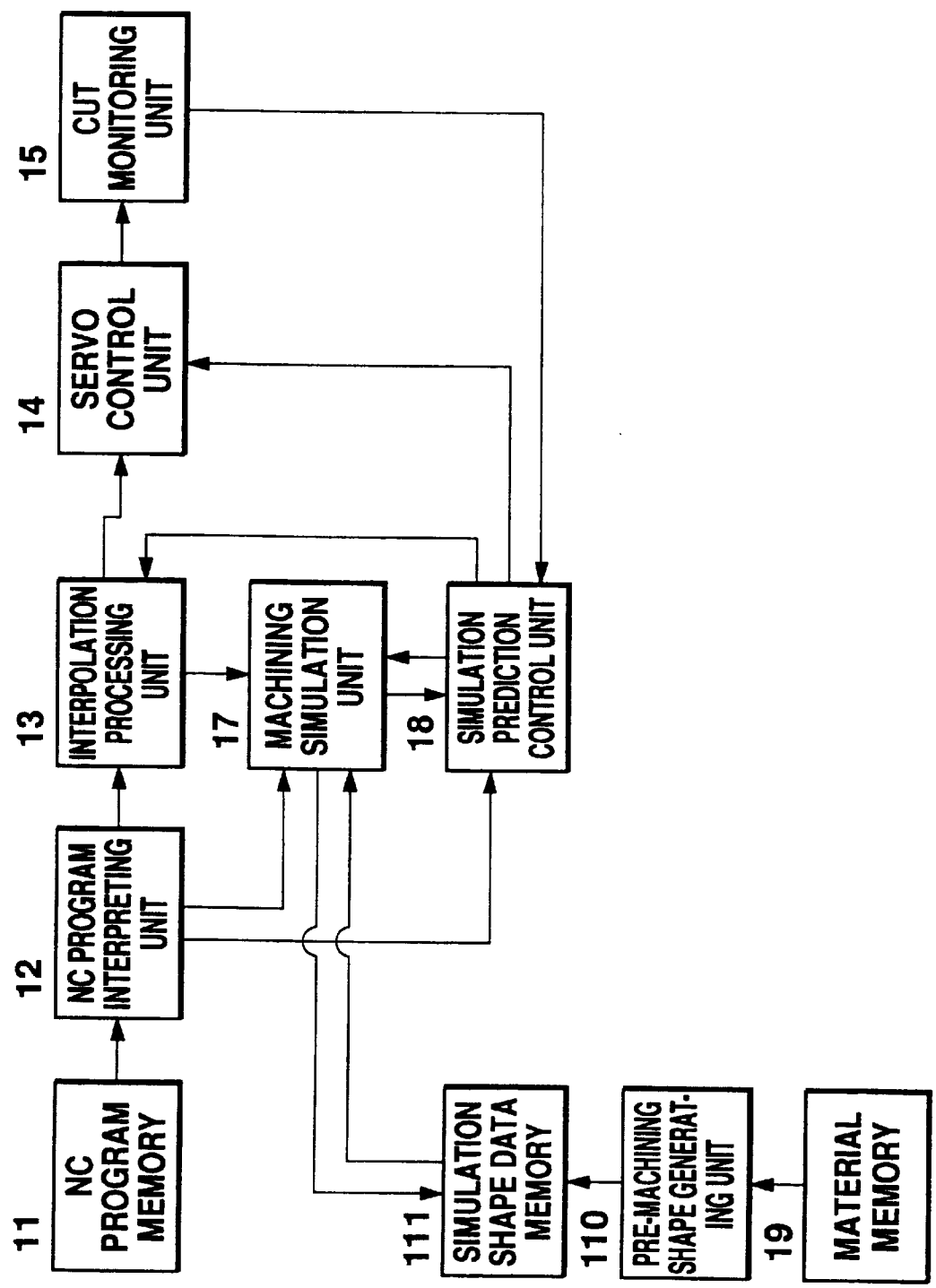
FIG. 4 is a block diagram showing a first embodiment of a machining simulation device related to the present invention used in NC machining.

In the block diagram in FIG. 4, blocks which are common with the block diagram in FIG. 1 have common reference numbers, and block 16 is missing in FIG. 4.

An NC program which will be used for up-coming machining is stored in an NC program memory 11.

An NC program interpreting unit 12 reads the NC program in the NC program memory 11 block by block, and interprets the blocks. The NC program interpreting unit 12 sends to an interpolation processing unit 13 an interpolation kind, a target position, and a feedrate specified in the current block or specified prior to the current block as modal commands. The NC program interpreting unit 12 also notifies a machining simulation unit 17 a tool number and a spindle revolution speed, and furthermore notifies a simulation prediction control unit 18 of the tool number and a feedrate.

The interpolation processing unit 13 sends to a servo control unit 14 movements per unit time (per interpolation period) $\Delta x$, $\Delta y$, and $\Delta z$ for each shaft, based on the interpolation kind, the target position, and the feedrate.

Prior to machining, a pre-machining shape generating unit 110 reads material shape data in a material memory 19 which is preset in the present system, and converts the data into a data structure appropriate for the up-coming machining simulation and stores the converted data as machining simulation shape data in a simulation shape data memory 111.

Figure 7A:
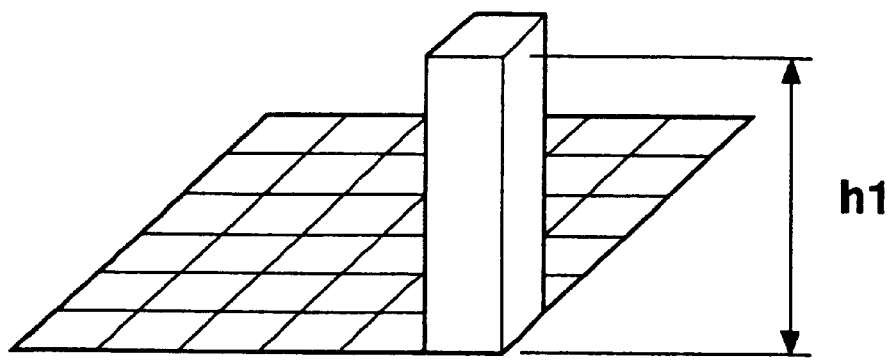
FIGS. 7(a) and 7(b) show an example of a simulation shape data structure related to the present invention.

A pre-machining shape generating unit 110 defines grid points at a predetermined interval on an X-Y surface corresponding to a material base, as shown in FIG. 7(a). Based on the material shape data, the pre-machining shape generating unit 110 judges whether the material extends in the Z direction at each grid point, and stores a height from the material base as a Z coordinate value corresponding to the grid point if the material extends in the Z direction, or stores 0 if it does not. Through this procedure, the material shape data in the material memory 19 are converted into data having a shape data structure which will be used in machining simulation, and the converted data are stored in the simulation shape data memory 111.

Figure 7B:
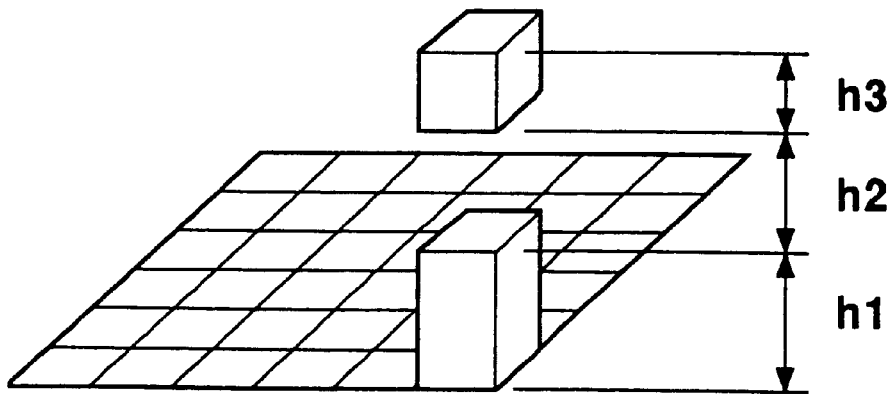

As shown by FIG. 7(b), for a single grid point, if there is a void space where no material exists between spaces in which the material exists in the Z direction, the Z coordinate value data stored in accordance with the grid point are not a single value. Therefore, a plurality of Z coordinate value data such as a height of the material portion, a height of the void space, and a height of another material portion must be stored.

A machining simulation unit 17 recognizes a shape of a tool use, such as a tool diameter, based on the tool number provided by the NC program interpreting unit 12 and a tool data memory which is pre-stored within the present system. The machining simulation unit 17 then calculates a cut amount per unit time based on the tool diameter, $\Delta x$, $\Delta y$, and $\Delta z$ values provided by the interpolation processing unit 13, and the machining simulation shape data sequentially read from the simulation shape data memory 110 as required. The machining simulation unit 17 calculates a cut amount per tool revolution based on the cut amount per unit time and a spindle revolution speed provided by the NC program interpreting unit 12, and notifies the simulation prediction control unit 18 of the cut amount per tool revolution.

Figure 8:
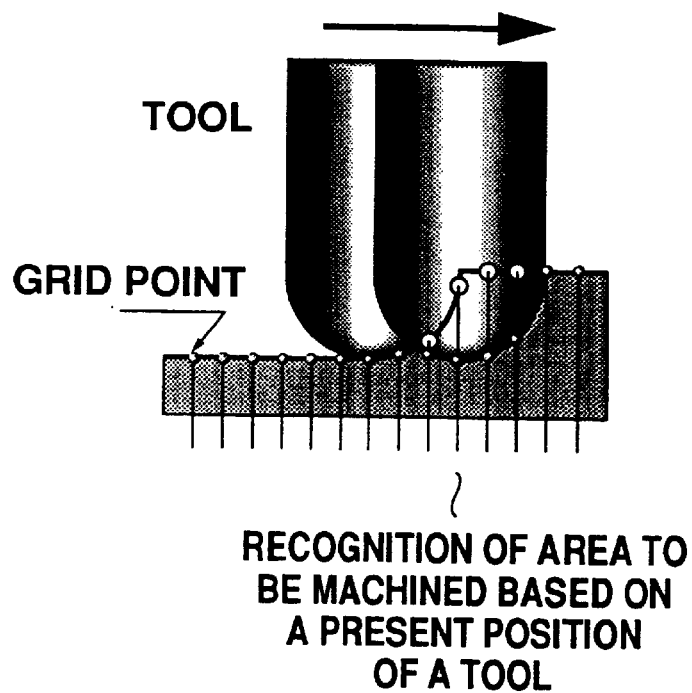
FIG. 8 shows explanatory views of machining simulation principle related to the present invention.
Figure 8:
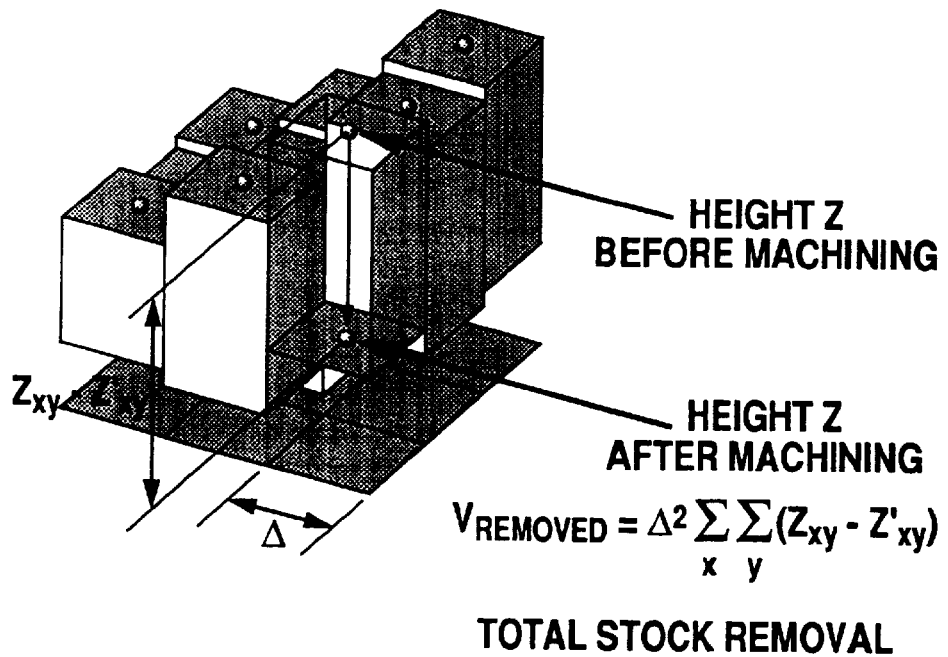

To obtain the cut amount per unit time, as shown by FIG. 8, it is specified which grid points the tool passes through among the grid points defined in the predetermined interval on the X-Y surface, using a present position of the tool X, Y, the tool diameter, and $\Delta x$ and $\Delta y$. It is then judged whether or not the tool cuts the material, based on the Z coordinate values the grid points have in the machining simulation shape, the present tool position Z and $\Delta z$. For each grid point judged as described above, a stock removal is calculated and by summation of the stock removal at each point, the cut amount per unit time can be obtained.

At this time, it is not known whether or not a tool movement based on $\Delta x$, $\Delta y$, and $\Delta z$ will actually be carried out. Therefore, neither updating machining simulation shape data in response to the stock removal by the tool movement based on $\Delta x$, $\Delta y$, and $\Delta z$ nor storage of the data in the simulation shape data memory will be carried out.

The simulation prediction control unit 18 calculates a machining simulation cut resistance value R and a cut torque T based on the cut amount per tool revolution provided by the machining summation unit 17 and material composition which is pre-stored within the present system.

An example of the simulation cut resistance value R and the torque value T using an end mill will be shown herein.

$$R = a \cdot Vp \text{(kgf)} \qquad \text{Equation 1}$$

$$T = B \cdot (n \cdot V)q \text{(kgf·cm)} \qquad \text{Equation 2}$$

V denotes a cut volume per tool revolution, n means the number of blades in the end mill, a, b, p, and q are parameters characteristic to the material composition.

A cut resistance value appropriate for the tool in use is obtained by the tool number provided by the NC program interpreting unit 12 and the tool data memory pre-set within the present system.

The cut resistance value appropriate for the tool may be set for each tool by an operator prior to machining.

After comparison between the cut resistance value obtained by simulation using the Equation 1 and the cut resistance value appropriate for the tool, if the cut resistance value obtained by simulation exceeds the cut resistance value appropriate for the tool, a feedrate is calculated so that the appropriate cut resistance value will be obtained, and the feedrate is sent as an appropriate feedrate to the interpolation processing unit 13 together with a reinterpolation request signal.

An equation for calculating the appropriate feedrate is as follows:

$$Sg = S \cdot Rg/Rs \quad \text{Equation 3.}$$

Sg means an appropriate feedrate, S denotes a commanded feedrate, Rg is an appropriate cut resistance value, and Rs means the cut resistance value obtained by simulation.

On the other hand, if the cut resistance value obtained by simulation does not exceed the cut resistance value appropriate for the tool, a machining shape updating signal is sent to the machining simulation unit 17 and an appropriate speed signal is sent to the interpolation processing unit 13.

After receiving the machining shape updating signal from the simulation prediction control unit 18, the machining simulation unit 18 updates the machining simulation shape data in response to the stock removal by a tool movement based on the $\Delta x$, $\Delta y$, and $\Delta z$ values, and stores the machining simulation shape data in the simulation shape data memory 111.

Updating the machining simulation shape data is carried out by subtracting the stock removal from the z coordinate value stored for each grid point.

After receiving a signal showing an appropriate feedrate from the simulation prediction control unit 18, the interpolation processing unit 13 transfers the $\Delta x$, $\Delta y$, and $\Delta z$ values calculated this time to the servo control unit 14. As a result, a cut is carried out with the feedrate judged to create the appropriate cut resistance value.

On the other hand, if the re-interpolation request signal is received, the interpolation processing unit 13 destroys all data previously interpolated, and re-calculates a movement of each axis per unit time $\Delta x'$, $\Delta y'$, and $\Delta z'$ based on the appropriate feedrate received from the simulation prediction control unit 18, and notifies $\Delta x'$, $\Delta y'$, and $\Delta z'$ to the machining simulation unit 17.

Based on the $\Delta x'$, $\Delta y'$, and $\Delta z'$, the machining simulation unit 17 calculates the cut amount per tool revolution in the same manner as described above, and notifies the simulation prediction control unit 18 of the newly calculated values.

Based on the cut amount per tool revolution, the simulation prediction control unit 18 calculates the simulation cut resistance value in the same manner as described above.

The simulation cut resistance value is based on the interpolation processing and the machining simulation result using the appropriate feedrate calculated by the simulation prediction control unit 18. Since the simulation cut resistance value does not naturally exceed an appropriate cut resistance value, the signal showing an appropriate feedrate is sent to the interpolation processing unit 13 while the machining shape updating signal is sent to the machining simulation unit 17.

As a result, the interpolation processing unit 13 notifies the servo control unit 14 of $\Delta x'$, $\Delta y'$, and $\Delta z'$ calculated by an interpolation based on the appropriate feedrate previously obtained by the simulation prediction control unit 18. Therefore, a cut is performed with the feedrate creating an appropriate cut resistance value.

Based on the cut torque calculated by the Equation 2 above, comparison between the calculated cut torque and a cut torque in immediately preceding interpolation is carried out, and a torque feed forward amount is calculated by the change from the immediately preceding torque. It is possible to send the torque feed forward amount obtained as described above to the servo control unit 14.

In this case, the servo control unit 14 uses the torque feed forward amount for torque control such that the feedrate or the cut speed is kept constant.

The cut monitoring unit 15 receives from the servo control unit 14 a spindle load and a feeding shaft load actually detected, and monitors a relationship between the loads and the simulation cut resistance value calculated by the appropriate feedrate. If the relationship deviates from a proportional relationship, for example, the cut monitoring unit 15 immediately notifies the interpolation processing unit 13 of a feeding suspension signal, so that the interpolation is suspended.

A second embodiment related to machining simulation device and method of the present invention used in NC machining is a machining simulation device which temporarily generates an NC program using machining data input by an operator, carries out machining simulation based on the NC program and material shape data, and carries out speed command determination in the NC program based on a cut amount recognized by the simulation or a cut resistance value obtained by the cut amount.

An example of the present machining simulation device used in NC machining separated from a numerical control device will be explained.

Hereinafter, explanation will be provided referring to a block diagram in FIG. 5.

Figure 2:
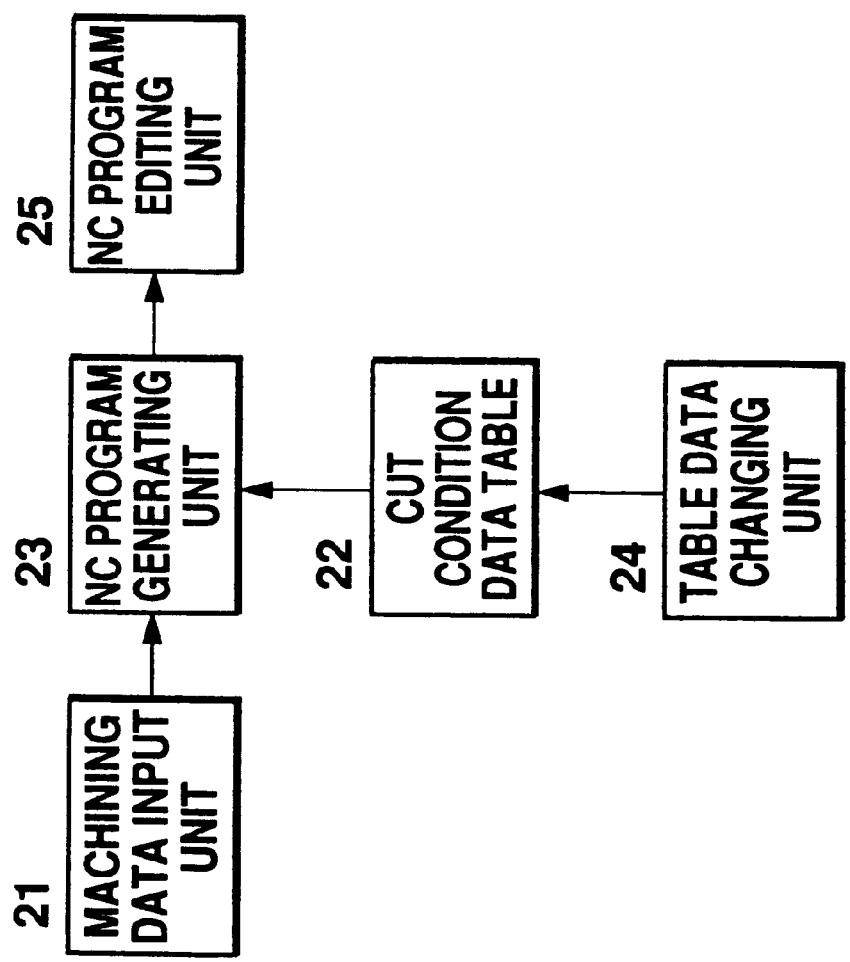
FIG. 2 is a block diagram showing a conventional NC program generating system.
Figure 5:
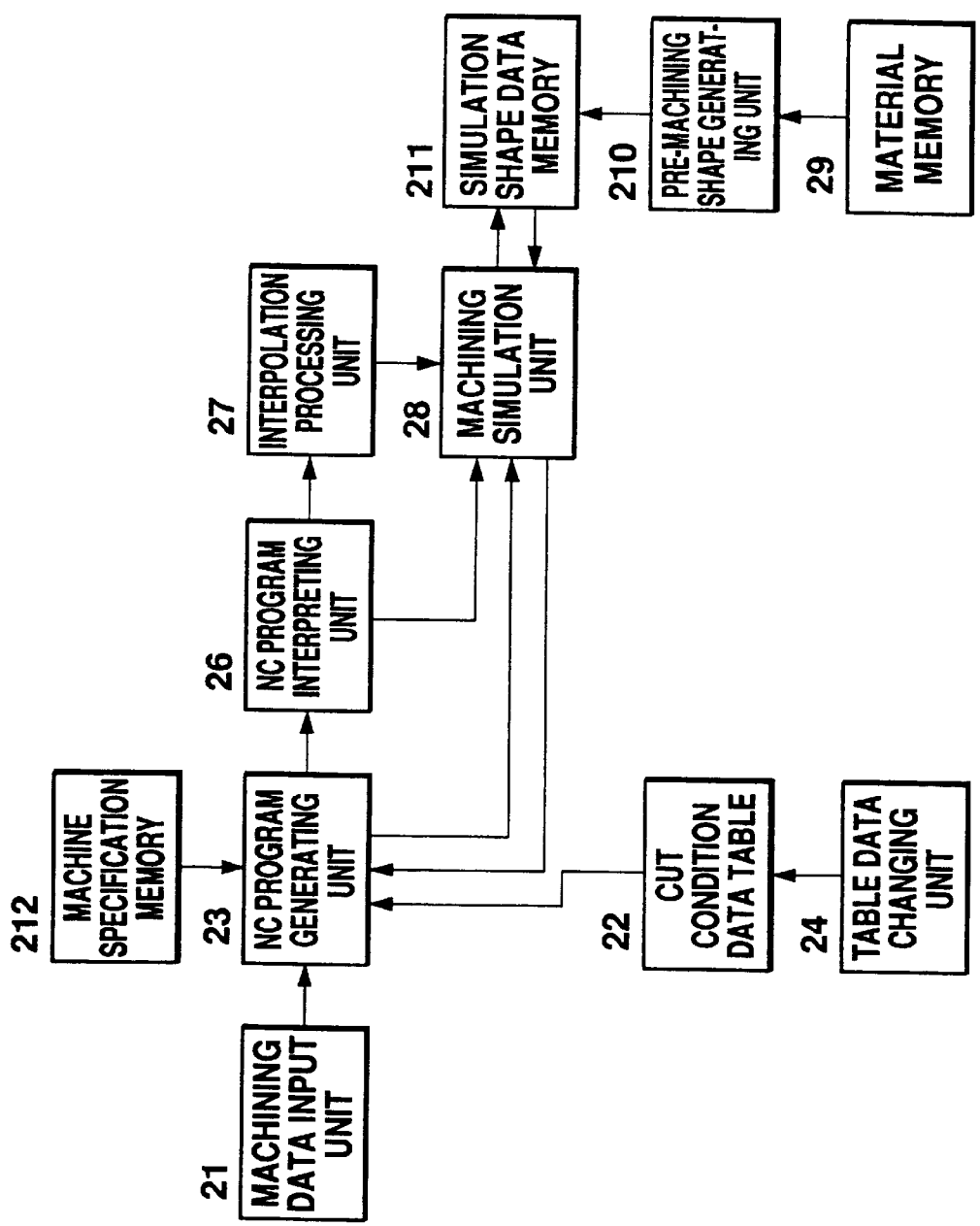
FIG. 5 is a block diagram showing a second embodiment of a machining simulation device related to the present invention used in NC machining.

In the block diagram in FIG. 5, blocks common to the block diagram in FIG. 2 have the same reference numbers, and block 25 is missing in FIG. 5. For blocks common to or similar to the blocks in FIG. 4, no common reference numbers are used, since the explanation of the blocks will be provided again for the sake of easier comprehension.

An operator inputs to the machining data input unit 21 a tool kind, a tool size, material composition, a machining tool path, and the like which are necessary information for generating an NC program. The input result is then sent to the NC program generating unit 23.

The cut condition table 22 has a data table structure such that a feedrate, the number of spindle revolutions, and the like are determined by the tool kind, the tool size, the material composition, the machining tool path, and the like in order to be appropriate for them. The cut condition data table is referred to by the NC program generating unit 23.

The NC program generating unit 23 generates an NC program based on machining data such as the tool kind, the tool size, the material composition, and the tool path provided by the machining data input unit 21, and the cut condition read from the cut condition data table 22 such as the feedrate and the number of revolution of the spindle or the like which are based on the tool kind, the tool size, and the material composition.

An NC program interpreting unit 26 reads the NC program from the NC program generating unit 23 block by block, and interprets the blocks. The NC program interpreting unit 26 sends to an interpolation processing unit 27 an interpolation kind, a target position, and a feedrate specified in the current block or specified prior to the current block as modal commands. The NC program interpreting unit 26 also sends a tool number and a spindle revolution speed to the machining simulation unit 28.

An interpolation processing unit 27 sends to the machining simulation unit 28 a virtual interpolation movement per unit time (for example, per interpolation period of a target NC device) $\Delta x$, $\Delta y$, and $\Delta z$ for each shaft, based on the interpolation kind, the target position, and the feedrate.

A pre-machining shape generating unit 210 reads, prior to NC program generation, material shape data from a material memory 29 which is set in the present system in advance. The pre-machining shape generating unit 210 converts the data read from the material memory 29 into data having a data structure appropriate for an up-coming machining simulation and stores the converted data in a simulation shape data memory 211 as machining simulation shape data. Alternatively, an operator can input a material shape each time before machining simulation, and the input data may be stored in the simulation shape data memory 211 as machining simulation shape data.

The pre-machining shape generating unit 210 defines grid points at a predetermined interval on an X-Y surface corresponding to a material base, as shown in FIG. 7(*a*). Based on the material shape data, the pre-machining shape generating unit 210 judges whether the material extends in the Z direction at each grid point, and stores a height from the material base as a Z coordinate value corresponding to the grid point if the material extends in the Z direction or stores 0 if it does not. Through this procedure, the material shape data in the material memory 29 are converted into data having a shape data structure which will be used in machining simulation, and the converted data are stored in the simulation shape data memory 211.

As shown by FIG. 7(*b*), for a single grid point, if there is a void space where no material exists between spaces in which the material exists in the Z direction, the Z coordinate value data stored in accordance with the grid point are not a single value. Therefore, a plurality of Z coordinate value data such as a height of the material portion, a height of the void space, and a height of another material portion must be stored.

The machining simulation unit 28 recognizes a shape of a tool in use such as a tool diameter based on the tool number provided by the NC program generating unit 23 and a tool data memory which is pre-stored within the present system. The machining simulation unit 28 then calculates a cut amount per unit time based on the tool diameter, $\Delta x$, $\Delta y$, and $\Delta z$ values provided by the interpolation processing unit 27, and the machining simulation shape data sequentially read from the simulation shape data memory 211 as required. The machining simulation unit 28 calculates a cut amount per tool revolution based on the cut amount per unit time and a spindle revolution speed provided by the NC program interpreting unit 26, and notifies the NC program generating unit 23 of the cut amount per tool revolution.

To obtain the cut amount per unit time, as shown by FIG. 8, it is specified which grid points the tool passes through among the grid points defined in the predetermined interval on the X-Y surface, using a present position of the tool X, Y, the tool diameter, and $\Delta x$ and $\Delta y$. It is then judged whether or not the tool cuts the material, based on the Z coordinate values the grid points have in the machining simulation shape, the present tool position Z and $\Delta z$. For each grid point judged as described above, a stock removal is calculated and by summation of the stock removal at each point, the cut amount per unit time can be obtained.

At this time, it is not known whether or not a tool movement based on $\Delta x$, $\Delta y$, and $\Delta z$ will actually be carried out. Therefore, neither updating machining simulation shape data in response to the stock removal by the tool movement based on $\Delta x$, $\Delta y$, and $\Delta z$ nor storage of the data in the simulation shape data memory 211 will be carried out.

The NC program generating unit 23 calculates machining for a simulation cut resistance value R (Equation 1) and a cut torque T (Equation 2) based on the cut amount per tool revolution provided by the machining summation unit 28 and material composition which is pre-stored within the present system.

A cut resistance value appropriate for the tool in use is obtained using the tool number and the tool data memory pre-set within the present system.

The cut resistance value appropriate for the tool may be set for each tool by an operator prior to machining.

After comparison between the cut resistance value obtained by simulation using the Equation 1 and the cut resistance value appropriate for the tool, if the cut resistance value obtained by simulation exceeds the cut resistance value appropriate for the tool, a feedrate is calculated so that the appropriate cut resistance value will be obtained.

An equation for calculating the appropriate feedrate is Equation 3, for example.

On the other hand, if the cut resistance value obtained by simulation does not exceed the cut resistance value appropriate for the tool, a machining shape updating signal is sent to the machining simulation unit 28.

After receiving the machining shape updating signal from the NC program generating unit 23, the machining simulation unit 28 updates the machining simulation shape data in response to the stock removal by a tool movement based on the $\Delta x$, $\Delta y$, and $\Delta z$ values, and stores the machining simulation shape data in the simulation shape data memory 211.

Updating the machining simulation shape data is carried out by subtracting the stock removal from the z coordinate value stored for each grid point.

If a feedrate for creating an appropriate cut resistance value is obtained, the NC program generating unit 23 destroys all data previously obtained by interpolation processing, and re-calculates a movement of each axis per unit time $\Delta x'$, $\Delta y'$, and $\Delta z'$ and notifies $\Delta x'$, $\Delta y'$, and $\Delta z'$ to the machining simulation unit 28.

Based on $\Delta x'$, $\Delta y'$, and $\Delta z'$, the machining simulation unit 28 calculates the cut amount per tool revolution in the same manner as described above.

Based on the cut amount per tool revolution, the NC program generating unit 23 calculates the simulation cut resistance value in the same manner as described above.

The simulation cut resistance value is based on the interpolation processing and the machining simulation result using the appropriate feedrate calculated by the NC program generating unit 23. Since the simulation cut resistance value does not naturally exceed an appropriate cut resistance value, a machining shape updating signal is sent to the machining simulation unit 28.

The NC program generating unit 23 calculates the appropriate feedrate at each interpolation unit. If interpolation units wherein the appropriate feedrate falls within a predetermined range continue, the units are connected and an appropriate F command is added to the units. If interpolation units wherein the appropriate feedrate does not fall within a predetermined range are adjacent, the units are divided into separate blocks and an appropriate F command is added to each block. Blocks in the original NC program are divided using this method.

In the foregoing calculation in the NC program generating unit 23, by judging whether the simulation cut resistance value changes from non-zero to zero, or stays at zero, or becomes non-zero from zero, a state change such as a change from a cutting state to an air-cutting state, a continuous air-cutting state, and a change from an air-cutting state to a cutting state is respectively detected. Using this detection, it becomes possible to increase a cut feedrate to a rapid traverse speed or a maximum interpolation speed having been stored in a machine specification memory 212, or to keep the increased speed, or to decrease the increased speed to an appropriate cut feedrate.

In the present embodiment, without using the interpolation processing unit 27, a method may be adopted in which the machining simulation unit 28 calculates a cut amount per block and a machining time per block, using a block path provided by the NC program interpreting unit 26, and judges appropriateness or inappropriateness of the feedrate based on the calculated result, and changes an F command.

On the other hand, if an operator changes a reference feedrate in advance, in the table data changing unit 24 for example, a change is to be specified in the table showing a relationship between the tool kind, the tool size, the material composition or the like, and the feedrate, the number of revolutions of the spindle, or the like.

A third embodiment related to the machining simulation device and method of the present invention used in NC machining is a machining simulation device which performs a real time machining simulation based on material and tool shape data, and generates actual tool performance information based on data such as a cut amount recognized by the simulation and a tool portion used for cutting.

Hereinafter, an explanation will be provided referring to a block diagram in FIG. 6.

Figure 3:
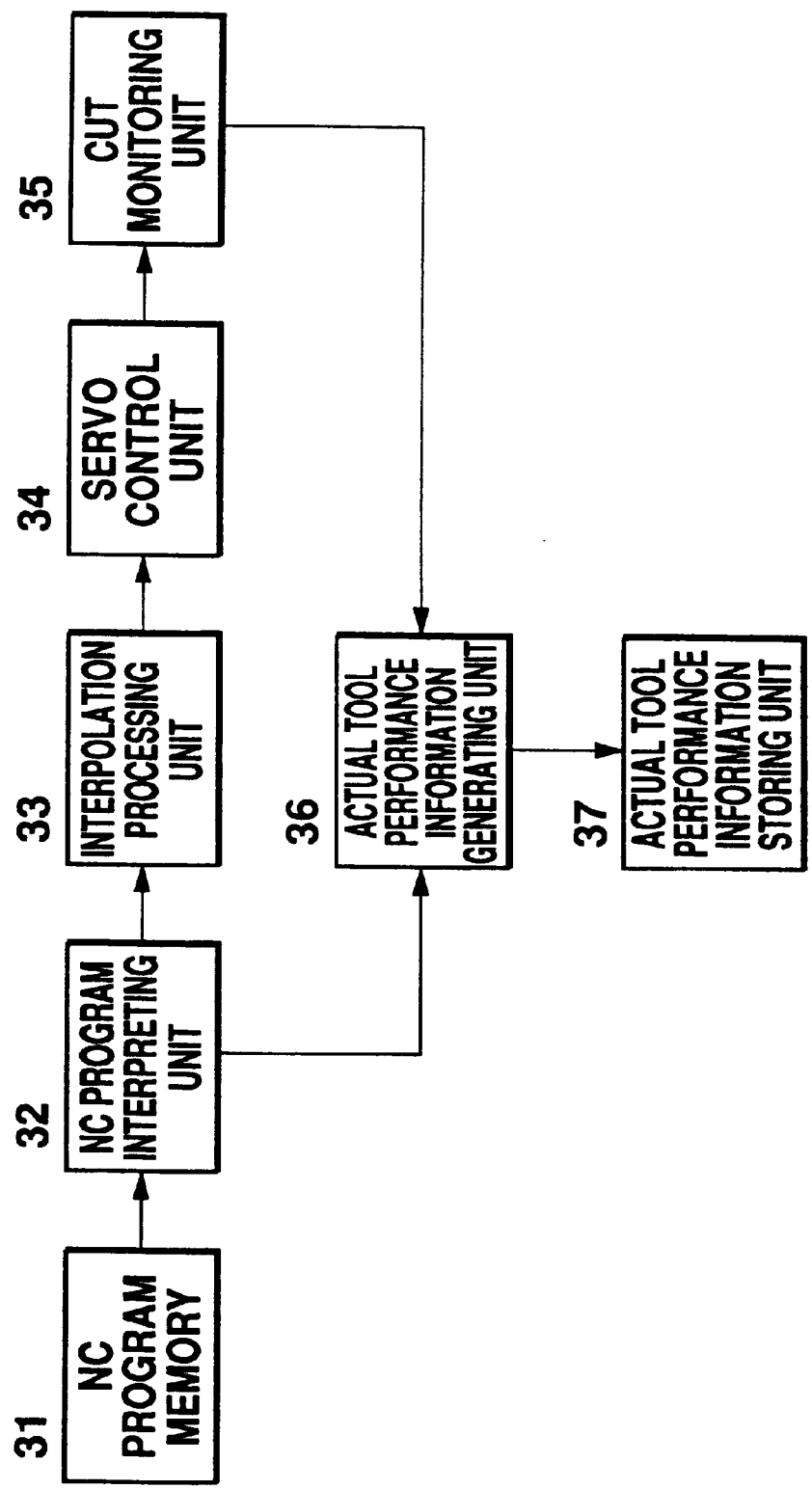
FIG. 3 is a block diagram showing a conventional actual tool performance information generating system.
Figure 6:
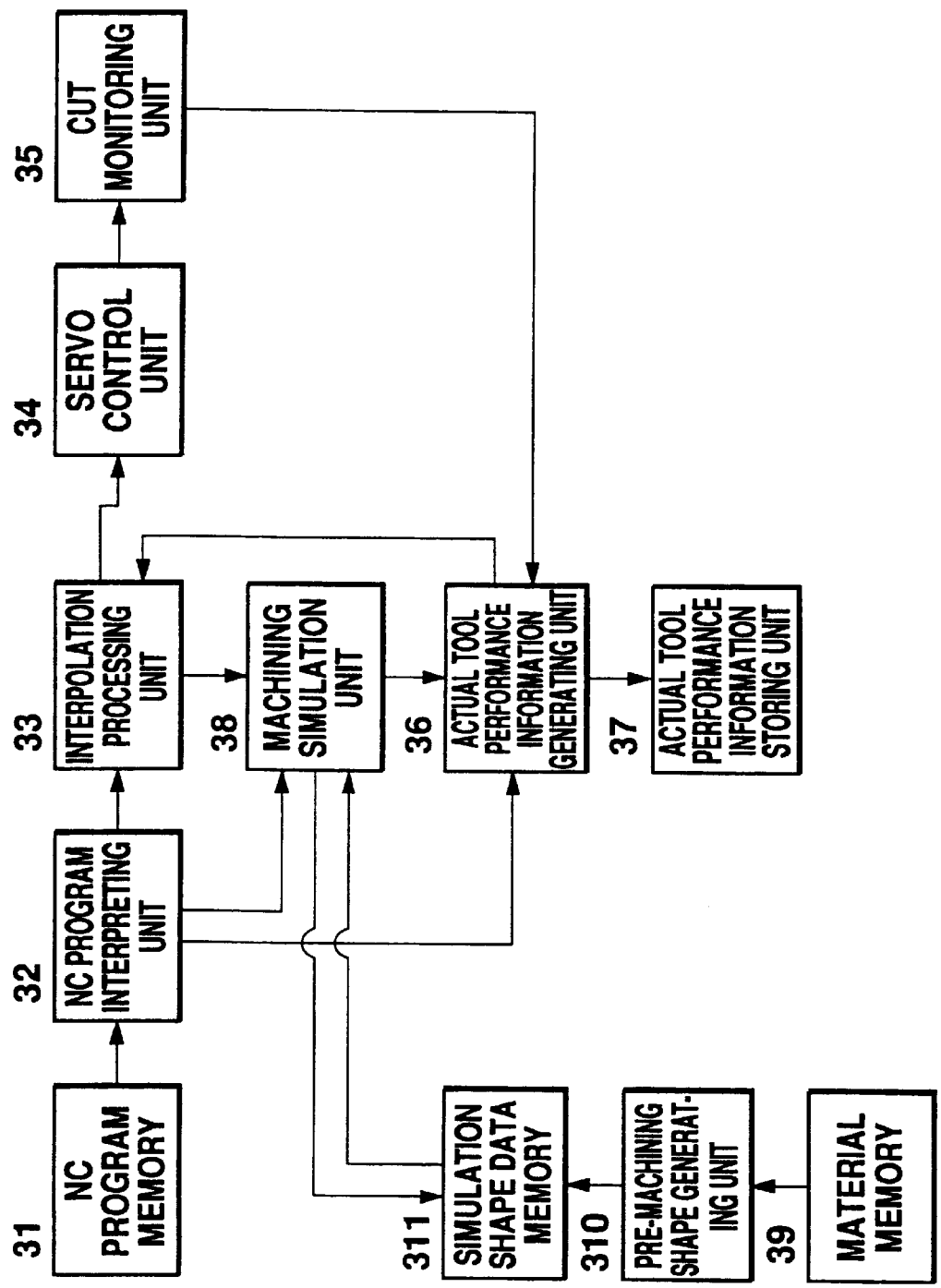
FIG. 6 is a block diagram showing a third embodiment of a machining simulation device related to the present invention used in NC machining.

In the block diagram in FIG. 6, blocks common to the block diagram in FIG. 3 have the same reference numbers. For blocks common to or similar to the blocks in FIG. 4, no common reference numbers are used, since the explanation of the blocks will be provided again for the sake of easier comprehension.

An NC program which will be used for the up-coming machining is stored in an NC program memory 31.

An NC program interpreting unit 32 reads the NC program from the NC program memory 31 block by block, and interprets the blocks. The NC program interpreting unit 26 sends to an interpolation processing unit 33 an interpolation kind, a target position, and a feedrate specified in the current block or specified prior to the current block as modal commands. The NC program interpreting unit 32 also sends a tool number and a spindle revolution speed to the machining simulation unit 38, and at the same time sends information necessary for generating actual tool performance information (such as a T command, an S command, an M command for a tool revolution direction) to an actual tool performance information generating unit 36, based on the NC program block being specified.

The interpolation processing unit 33 calculates and sends to the machining simulation unit 38 a movement per unit time (per interpolation period) $\Delta x$, $\Delta y$, and $\Delta z$ of each shaft based on the interpolation kind, the target position, and the feedrate.

A pre-machining shape generating unit 310 reads, prior to NC program generation, material shape data from a material memory 39 which is set in the present system in advance. The pre-machining shape generating unit 310 converts the data read from the material memory into data having a data structure appropriate for up-coming machining simulation and stores the converted data in a simulation shape data memory 311 as machining simulation shape data. Alternatively, an operator can input a material shape each time before machining simulation, and the input data may be stored in the simulation shape data memory 311 as machining simulation shape data.

The pre-machining shape generating unit 310 defines grid points in a predetermined interval on an X-Y surface corresponding to a material base, as shown in FIG. 7(a). Based on the material shape data, the pre-machining shape generating unit 310 judges whether the material extends in the Z direction at each grid point, and stores a height from the material base as a Z coordinate value corresponding to the grid point if the material extends in the Z direction or stores 0 if it does not. Through this procedure, the material shape data in the material memory 39 are converted into data having a shape data structure which will be used in machining simulation, and the converted data are stored in the simulation shape data memory 311.

As shown by FIG. 7(b), for a single grid point, if there is a void space where no material exists between spaces in which the material exists in the Z direction, the Z coordinate value data stored in accordance with the grid point are not a single value. Therefore, a plurality of Z coordinate value data such as a height of the material portion, a height of the void space, and a height of another material portion must be stored.

The machining simulation unit 38 recognizes a shape of a tool in use such as a tool diameter based on the tool number provided by the NC program interpreting unit 32 and a tool data memory which is pre-stored within the present system. The machining simulation unit 38 then sends to the actual tool performance information generating unit 36 data such as a cut amount per interpolation, a cut length, and a tool portion for cutting (which portion of the tool is used for cut), based on the tool diameter, $\Delta x$, ly, and A z values provided by the interpolation processing unit 33, and the machining simulation shape data sequentially read from the simulation shape data memory 311 as required.

While machining is in progress, the machining simulation unit 38 performs update processing to remove the stock removal from the material shape in the simulation shape data memory 311 simultaneously, although this processing is not explained in detail herein.

The actual tool performance information generating unit 36 generates actual tool performance information such as listed below:

1) The T command sent from the NC program interpreting unit 32, accumulations of the cut amount and the cut length per each tool obtained by the cut amount and the cut length per each interpolation sent from the machining simulation unit 38.

2) The S command sent from the NC program interpreting unit 32, the tool portion for cutting sent from the machining simulation unit 38, accumulations of the cut amount and the cut length for each tool blade edge obtained by the accumulation of the above cut amount per each tool and the accumulation of the cut length per each tool.

3) The T command and the S command sent from the NC program interpreting unit 32, and an accumulation of the number of collisions between the material to be machined and the tool blade edge classified by the tool portion for cutting sent from the machining simulation unit 38.

4) The T command and an M command for a tool revolution direction sent from the NC program interpreting unit 32, the engagement angle of a tool depending on the tool portion for cutting sent from the machining simulation unit 38, whether up cut milling or down cut milling is being carried out, the cut width, and the cut depth.

Figure 9:
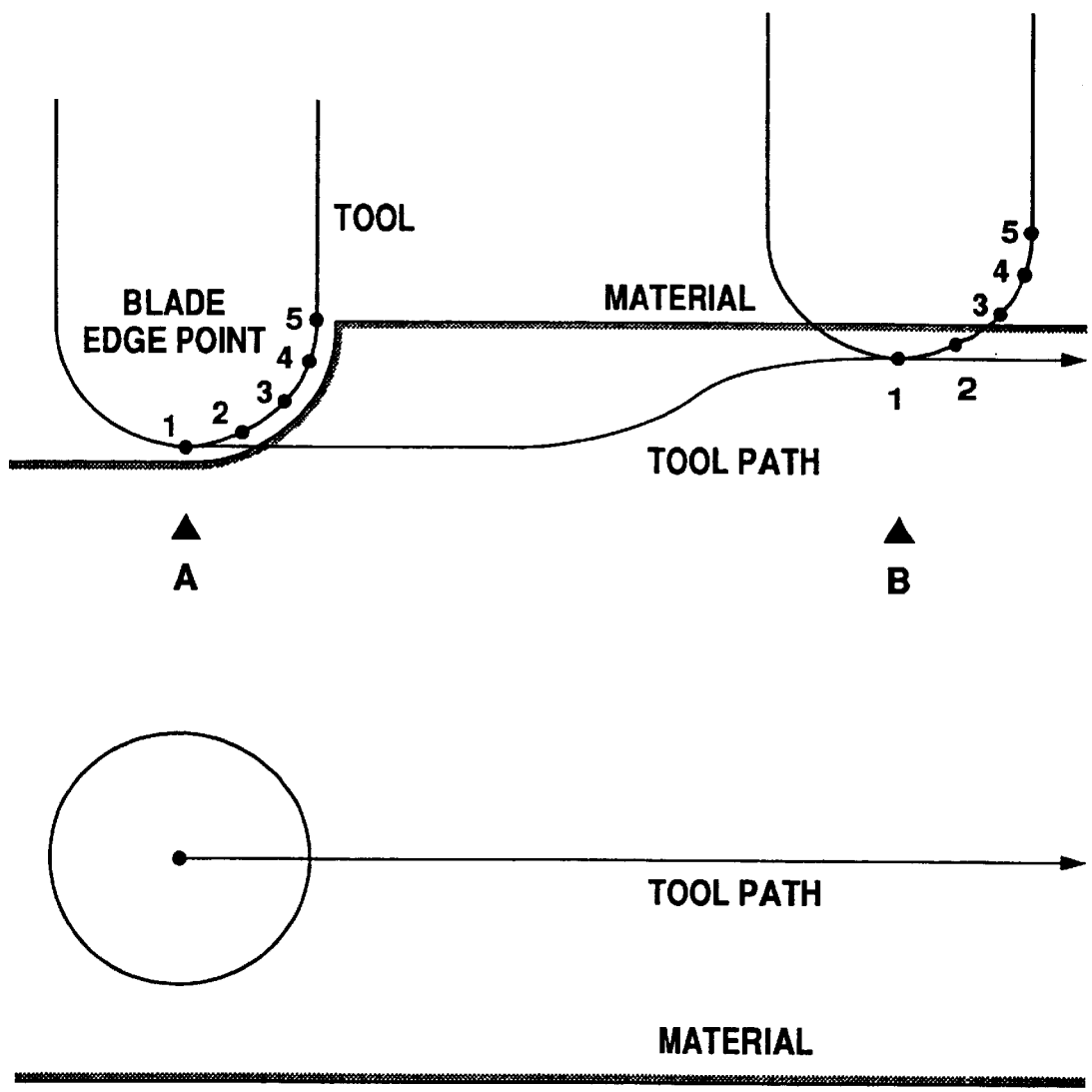
FIG. 9 shows an example of a change in cut amount contained in an actual tool performance information related to the present invention.

For example, in machining shown by FIG. 9, only whether or not the material is being cut has conventionally been judged. However, in the present embodiment, cut amounts between blade edge points 1-2, 2-3, 3-4, 4-5 can individually be recognized at point A. At point B, cut amounts between blade edge points 1-2, and 2-3 can individually be recognized, and it is also recognized that no cut is observed between the blade edge points 3-4, and 4-5. The above cut amounts are accumulated as the cut amount for each blade edge point.

Figure 10:
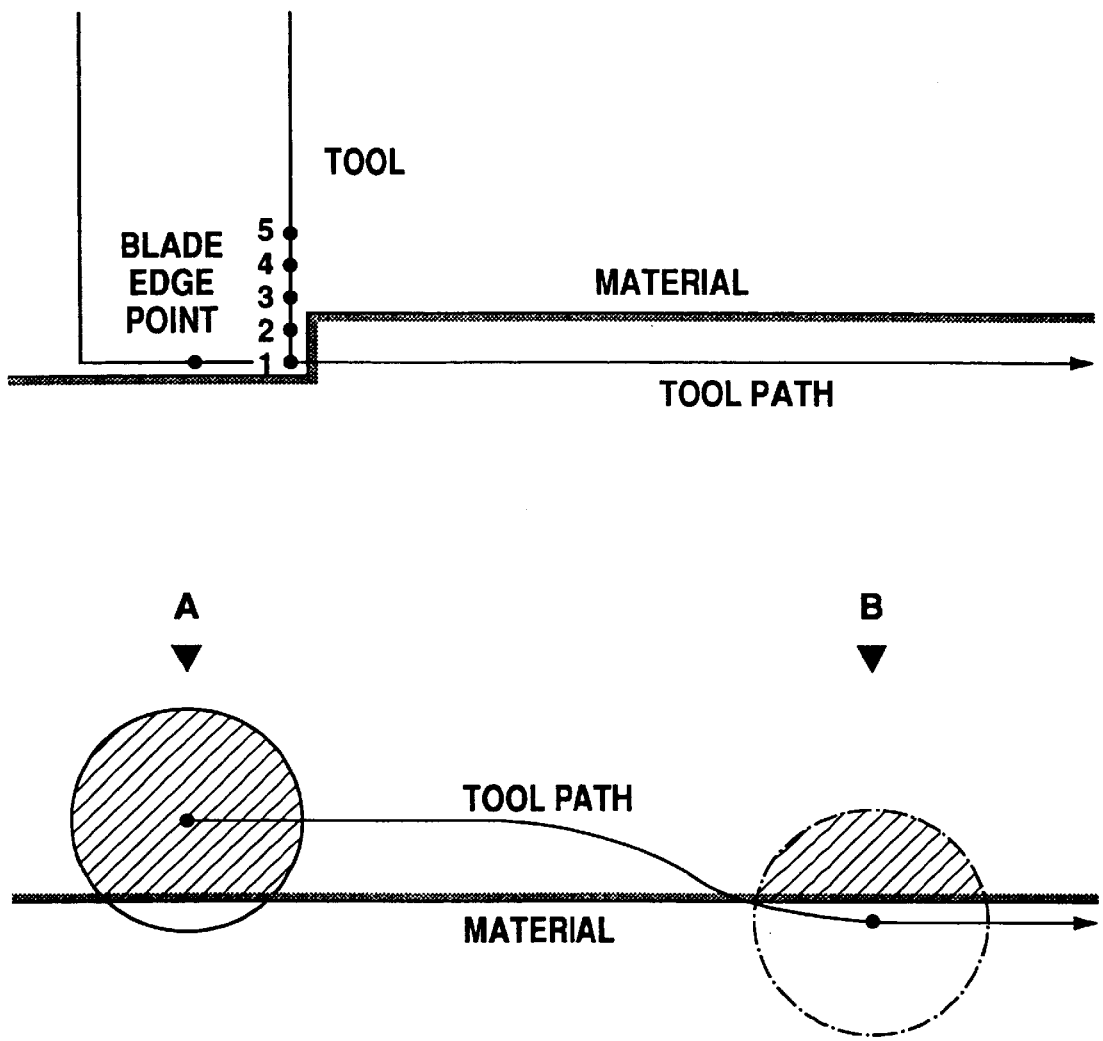
FIG. 10 shows an example of a change in engagement angle contained in actual tool performance information related to the present invention.
Figure 12:
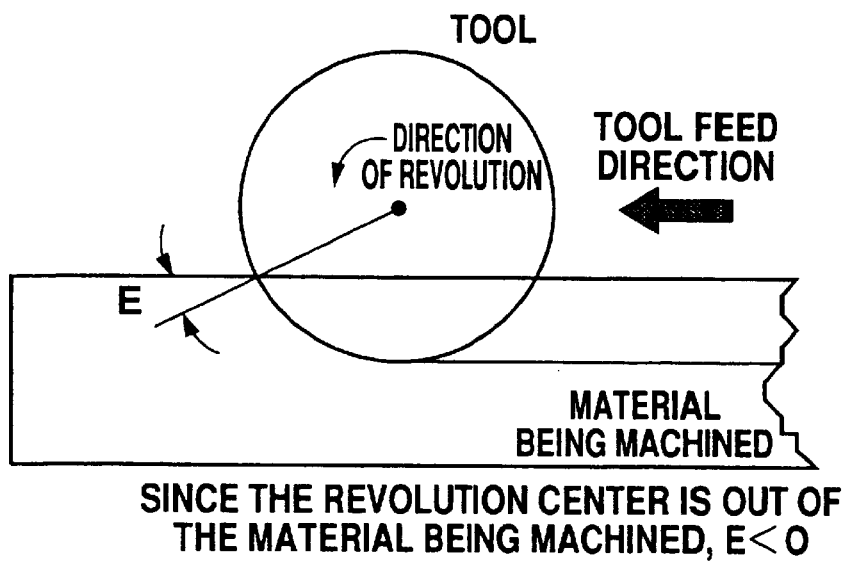
FIG. 12 shows explanatory views of engagement angle contained in actual tool performance information data related to the present invention.
Figure 12:
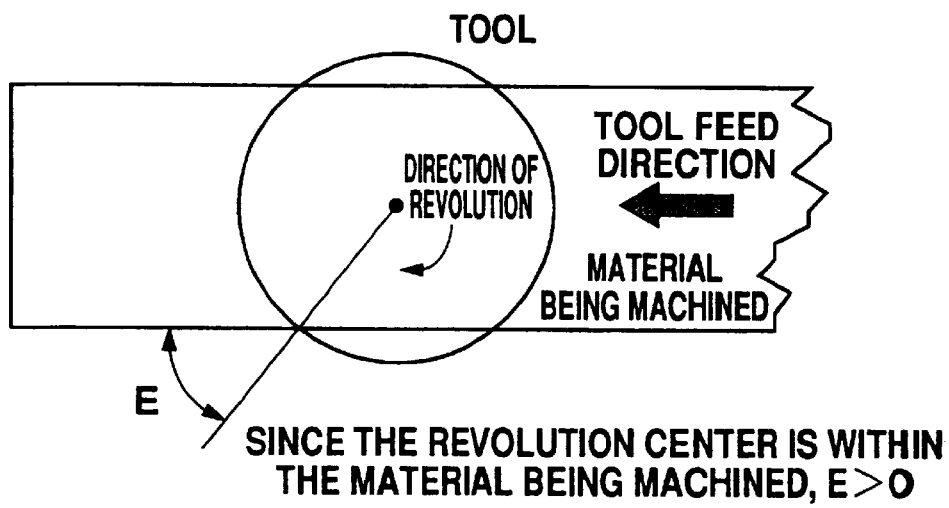

In machining such as shown by FIG. 10, only whether or not the material is being cut has conventionally been judged. However, in the present embodiment, it is recognized that at point A, an engagement angle is large so that the tool is being loaded, while at point B, the engagement angle is small so that the tool is not being heavily loaded. The engagement angle is one of index information used for judgment of appropriate machining angle, as shown by FIG. 12. The cut amount can of course be recognized even in the case shown in FIG. 10.

Figure 11:
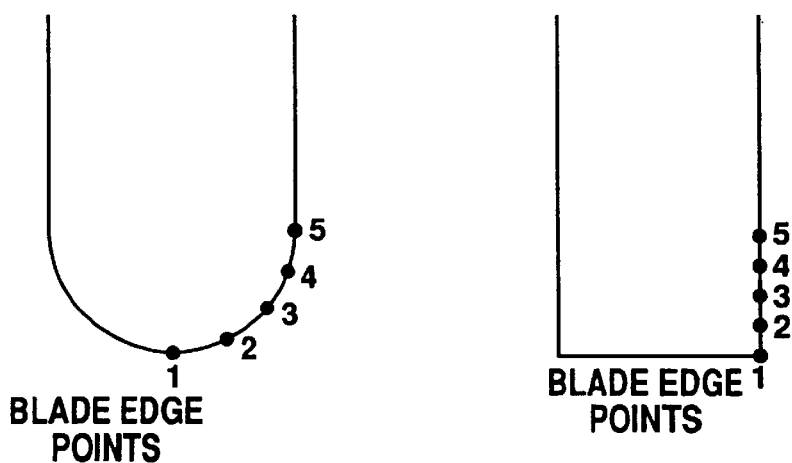
FIG. 11 shows an example of how actual tool performance information is retained.

In an actual tool performance information storing unit 37, information such as the above is stored in a form shown in FIG. 11 as information for each tool or for each tool blade edge.

The actual tool performance information generating unit 36 may judge whether or not the tool is in the air-cutting state, based on a spindle load and a feeding shaft load provided by a cut monitoring unit 35, and compare the result with data provided by the machining simulation unit 38 (presence or absence of the tool portion for cutting).

The third embodiment above has been explained with reference to the first embodiment. However, the third embodiment may be explained with reference to the second embodiment.

Furthermore, a combination of the embodiments is also possible.

Figure 13:
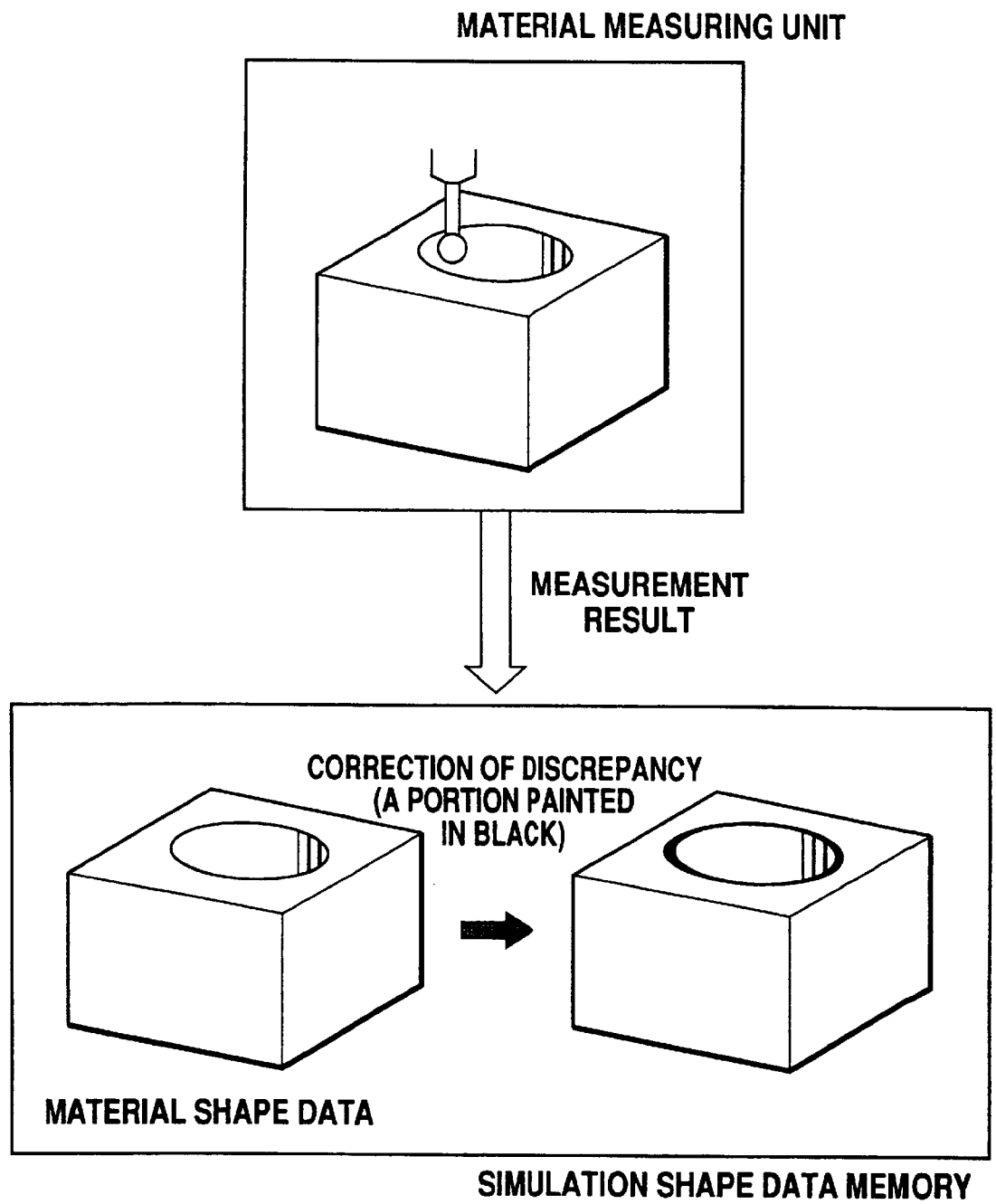
FIG. 13 shows explanatory views of how a correction is carried out based on material shape data related to the present invention using an actual work measurement result.

In any of the embodiments above, measurement data of actual material to be machined or tools to be used can be used as the material shape data and the tool shape data. It is also possible, as shown by FIG. 13, to correct the material shape data using an actual measurement result of the material having been machined, or to correct the tool shape data using an actual measurement result of the tool to be used.

Figure 14A:
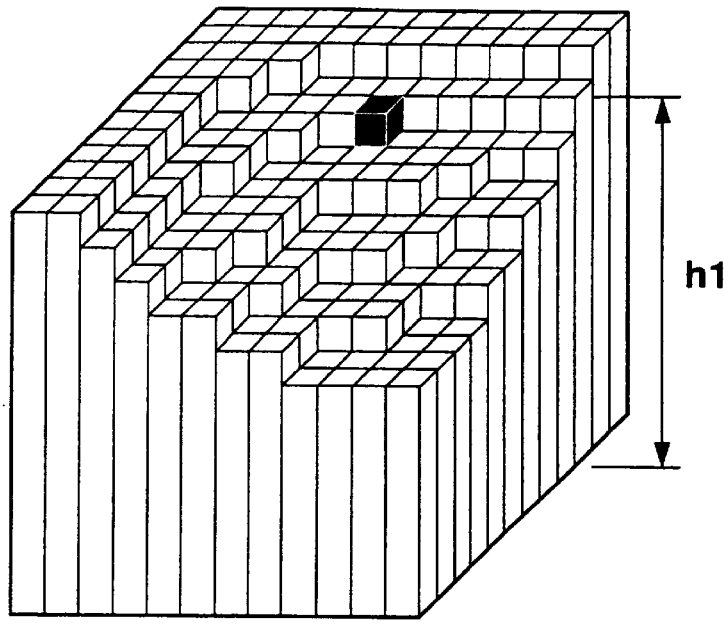
FIGS. 14(a) and 14(b) show an example of a simulation shape structure in a case where a material shape related to the present invention is divided by three dimensional grid points.
Figure 14B:
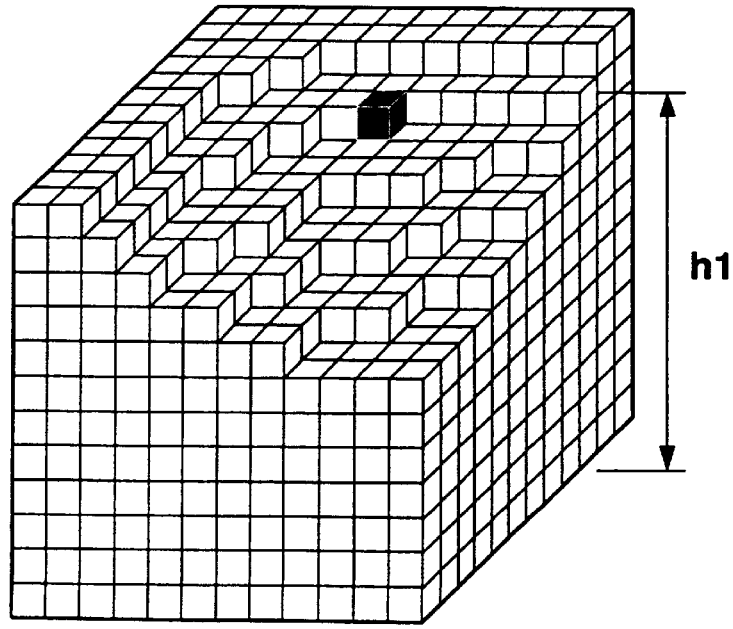

In any of the embodiments above, when the pre-machining shape generating unit 110 (or 210 or 310) converts the material shape data read from the material memory 19 (or 29 or 39) into the data having the data structure appropriate for the up-coming machining simulation, the material shape data can be stored in the simulation shape data memory 111 (or 211 or 311) by dividing the material shape using three dimensional grid points as shown in FIG. 14(*b*). For example, in a case where the portion painted in black in FIG. 14 is to be removed, if the X-Y surface is divided by grid points and the material height is expressed by the Z coordinate value, as shown in FIG. 14(*a*), the Z coordinate value changes from z(x) (y)=h(1) to (h1-1) On the other hand, as shown by FIG. 14(*b*), if the material is divided using three dimensional grid points, P(x,y,h1) will change from 1 to 0.

In the first embodiment, the feedrate control by the present machining simulation device used in NC machining is carried out after the interpolation processing, and the motor torque correction value by the present machining simulation device is sent to the current control unit in the servo control.

In the second embodiment, the present machining simulation device used in NC machining is separated from a numerical control device, and the speed command determination in the NC program is carried out prior to machining.

In the third embodiment, the present machining simulation device used in NC machining performs the real time machining simulation based on the material shape data and the tool shape data, and the actual tool performance information is generated based on data such as the cut amount resulting from the simulation, and the tool portion for cutting.

However, embodiments of the present invention are not limited to those above, and it is possible that each means comprising the above device are replaced by steps for realizing each function of the device.

Furthermore, at least in the first and second embodiments, the device and method of the present invention can properly generate the cut amount, the cut resistance value, shapes before, during, and after machining, and the appropriate feedrate through the procedures described in the above explanation of the embodiments, if essential equivalents of the material shape, the tool shape, and the interpolation data are prepared and input to the device and method of the present invention.

Using this function for generating the appropriate feedrate, it becomes possible to determine the appropriate feedrate prior to an actual interpolation processing, if the feedrate control by the present device and method is incorporated between an NC program interpreting unit and an interpolation processing unit.

Moreover, using a numerical control system comprising a pre-interpolation acceleration/deceleration processing unit used prior to an interpolation processing for avoiding a shape error due to acceleration or deceleration such as machine vibration caused by a dramatic change in the feedrate, damage to a tool, and a change in the feedrate, machining can be carried out at an appropriate feedrate, suppressing the shape error due to acceleration or deceleration and without machine vibration if the feedrate control of the present device and method is incorporated between an NC program interpreting unit and the pre-interpolation acceleration/deceleration processing unit.

The material shapes prior to, during, and after machining are generated in order, which is not explained herein, however.

Therefore, by inputting the material shape data into a graphic display unit, the data can be used for a graphic display function.

Likewise, if the graphic display is carried out by taking out and coloring the cut amount, the cut resistance value and the like, a change in machining state can be graphically displayed.

While there have been described what are at present considered to be preferred embodiments of the invention, it will be understood that various modifications may be made thereto, and it is intended that the appended claims cover all such modifications as fall within the true spirit and scope of the invention.

ADVANTAGEOUS RESULTS OF THE PRESENT INVENTION

According to the present invention, machining at an optimal feedrate can be easily carried out, since a machining simulation on a graphic data is carried out prior to machining, and based on the simulation result, a feedrate, a torque feed forward amount, and the like can be reflected on actual machining and machining program generation as conditions appropriate for actual machining.

Optimization of the feedrate can be performed in an NC program generating step, or after NC program interpretation, or during an interpolation processing.

Furthermore, since accurate actual tool performance information can be generated, a user of the machine tool can, through analysis of the information, contribute to determination of machining conditions endurable for a long term unmanned operation, improvement of machining techniques for work shape accuracy enhancement and machined surface accuracy enhancement, and a tool manufacturer can also contribute to development of a tool with longer life and higher abrasion endurance which is appropriate for its customers' environment.

What is claimed is:

1. A machining simulation device used in NC machining comprising:

machining simulation means for simulating a cut on a material to be cut based on machining information; and numerical control command generating means for generating a numerical control command from at least one of a cut resistance value and a cut torque value based on a cut amount per tool revolution obtained from the machining simulation means.

2. A machining simulation device used in NC machining comprising:

machining simulation means for simulating a cut on a material based on machining information; and actual tool performance information generating means for generating actual tool performance information from at least one of a cut resistance value and a cut torque value based on a cut amount per tool revolution obtained from the machining simulation means.

3. The machining simulation device used in NC machining according to claim 1 wherein the machining information comprises an NC program, material shape data, and tool shape data.

4. The machining simulation device used in NC machining according to claim 1 wherein the machining simulation means comprises:

material shape data generating means for converting the material shape data into machining simulation shape data which are divided using three dimensional grid points prior to the simulation;

simulation shape storing means for storing the machining simulation shape data; and cut amount calculating means for calculating a stock removal amount as a cut amount based on the NC program and the tool shape data when the tool passes a material area on the grid points, and for updating information regarding presence or absence of the material on the grid points where the tool passes.

5. The machining simulation device used in NC machining according to claim 1 wherein the machining simulation means comprises:

material shape data generating means for dividing a material base of the material shape data using grid points and converting the material shape data into machining simulation shape data wherein a height of the material is expressed by vertical height data for the grid points prior to the simulation;

simulation shape storing means for storing the machining simulation shape data; and cut amount calculating means for calculating a stock removal amount as a cut amount based on the NC program and the tool shape data when the tool passes a material area on the grid points, and for updating information regarding presence or absence of the material on the grid points where the tool passes.

6. The machining simulation device used in NC machining according to claim 5 wherein the vertical height data comprises a height of an area where the material exists, or a combination of a height of an area where the material exists and a height of the area where no material exists.

7. The machining simulation device used in NC machining according to claim 1 wherein the numerical control command generating means generates an NC program, or NC program decoded data which are generated by decoding an NC program within an numerical control device, or interpolation data generated by the NC program decoded data so that a cut amount or a cut resistance value or a cut torque obtained as cut information falls within a predetermined range.

8. The machining simulation device used in NC machining according to claim 1 wherein the numerical control command generating means determines a torque feed forward amount using a change in a cut amount obtained as cut information so that a feedrate or a cut speed falls within a predetermined range.

9. The machining simulation device used in NC machining according to claim 1 wherein the numerical control command generating means replaces an NC program feedrate or a feedrate in NC program decoded data which are generated by decoding an NC program within an numerical control device with a rapid traverse speed of a machine, when a cut resistance value obtained as cut information becomes 0.

10. The machining simulation device used in NC machining according to claim 1 wherein the numerical control command generating means replaces an NC program feedrate or a feedrate in NC program decoded data which are generated by decoding an NC program within a numerical control device with a faster interpolation speed of a machine, when a cut resistance value obtained as cut information becomes 0.

11. The machining simulation device used in NC machining according to claim 1 wherein the numerical control command generating means comprises:

load detection means for actually detecting at least one of a spindle load or a feeding shaft load; and interpolation suspension means for suspending interpolation processing when the load detected by the load detection means and cut amount, or a cut resistance value, or a cut torque, obtained as cut information, exceeds a predetermined relationship.

12. The machining simulation device used in NC machining according to claim 2 wherein the actual tool performance information generating means has a function to accumulate at least one of a cut amount or a cut length by each tool to be used.

13. The machining simulation device used in NC machining according to claim 2 wherein the actual tool performance information generating means has a function to accumulate at least one of a cut amount or a cut length by each tool blade edge point to be used.

14. The machining simulation device used in NC machining according to claim 2 wherein the actual tool performance information generating means has a function to accumulate the number of collisions between a material and each tool blade to be used.

15. The machining simulation device used in NC machining according to claim 2 wherein
the actual tool performance information generating means has a function to store at least one of an engagement angle, whether up cut milling or down cut milling is used, a cut width, and a cut depth by each tool to be used.

16. The machining simulation device used in NC machining according to claim 3 wherein
the material shape data are shape data obtained by the machining simulation based on input material shape data, or data generated by correction of a portion of shape data obtained through the machining simulation by actually measured material shape data.

17. The machining simulation device used in NC machining according to claim 3 wherein
the tool shape data are data generated by correction of the input tool shape data by actually measured tool shape data.

18. A machining simulation method used in NC machining comprising the steps of:
machining simulation for simulating a cut on a material based on machining information; and
numerical control command generation for generating a numerical control command from at least one of a cut resistance value and a cut torque value based on a cut amount per tool revolution obtained in the machining simulation step.

19. A machining simulation method used in NC machining comprising the steps of:
machining simulation for simulating a cut on a material based on machining information; and
actual tool performance information generation for generating actual tool performance information from at least one of a cut resistance value and a cut torque value based on a cut amount per tool revolution obtained in the machining simulation step.

20. The machining simulation method used in NC machining according to claim 18 wherein,
in the numerical control command generation step, an NC program, or
NC program decoded data which are generated by decoding an NC program within an numerical control device, or
interpolation data generated by the NC program decoded data are generated so that a cut amount or a cut resistance value or a cut torque obtained as cut information falls within a predetermined range.

21. A medium storing a program to cause a computer to perform:
a machining simulation procedure for simulating a cut on a material based on machining information; and
a numerical control command generation procedure for generating a numerical control command from at least one of a cut resistance value and a cut torque value based on a cut amount per tool revolution.

22. The medium according to claim 21 wherein
the program to cause a computer to perform the machining simulation procedure generates
an NC program, or
NC program decoded data which are generated by decoding an NC program within a numerical control device, or
interpolation data generated by the NC program decoded data are generated so that a cut amount or a cut resistance value or a cut torque obtained as cut information falls within a predetermined range.

23. A medium storing a program to cause a computer to perform:
a machining simulation procedure for simulating a cut on a material based on machining information; and
actual tool performance information generation procedure for generating actual tool performance from at least one of a cut resistance value and a cut torque value based on a cut amount per tool revolution.

* * * * *